UNITED STATES PATENT OFFICE.

ROSENDO LADRON DE GUEVARA, OF VERA CRUZ, MEXICO.

BOILER-DISINCRUSTATING COMPOUND.

991,975.  Specification of Letters Patent.  Patented May 9, 1911.

No Drawing.  Application filed May 3, 1910.  Serial No. 559,167.

*To all whom it may concern:*

Be it known that I, ROSENDO LADRON DE GUEVARA, a citizen of the Republic of Mexico, residing in Vera Cruz, Mexico, have invented a new and Improved Boiler-Disincrustating Compound, of which the following is a full, clear, and exact description.

Among the principal objects which the present invention has in view are: To provide a compound which prevents the accumulation of scale or other incrustating coatings in boilers; to provide a compound the neutralizing effect of which is calculable and may be added to the water of the boiler in direct ratio to the water consumption thereof; and to provide a compound which is simple, economical and non-destructive.

The compound hereinafter set forth as possessing the qualities above described consists of the following ingredients, combined and prepared in the proportions as tabulated, to wit:—

| Lime or calcium oxid | 100 kilos. |
| Brick earth or powdered brick | 20 " |
| Refined petroleum | 15 " |
| Juice of agave leaves | 35 " |
| Carminic acid | 1 " |
| Hydro-chloric acid | 2 " |

The lime is unslaked, and the pulverized brick are admixed and ground until they are very fine. The petroleum and juice of the agave leaves are then first mixed with each other, and added to the pulverized lime and brick dust. The result of the mixture is a paste. Into this paste is incorporated the carminic and hydro-chloric acids. The paste resulting from this mixture is then sun-dried until it becomes hard or brittle. In this condition is it pulverized, producing a pink powder, which is then canned, packed or otherwise made ready for transportation and use. In its use the formula which it has been found by experience as most desired is that 10 grams of the powder is first mixed with 2 liters of water in any suitable vessel. The water and powder mixed in the above stated proportion is now introduced into the boiler, the quantity preferred being the 2 liters of water with the powder admixed for each horse power of the boiler.

It will be found that after 72 hours of ebullition the incrustation which may have accumulated in the boiler will precipitate or dissolve. This operation may be repeated at intervals of approximately one month apart. The compound is also used for destroying the soot formed by gases in the product of combustion in fire flues or conduits. In the use of the compound for the clearance of such agents, the proportion of water and powder is maintained as above stated, and is applied between the flues or fire conduits, closing and charging said conduits in a suitable manner so that the compound, on passing through the upper flues may escape through the lower. The time required for the cooling of the boiler will suffice for destroying the soot, the compound being introduced after the fire is drawn.

The disincrustating compound, when mixed and applied as above stated, obviates the dangers of explosion, purifies the steam and produces a larger efficiency thereof, resulting in a considerable economy of fuel.

The compound is applicable to all steam boilers, irrespective of the character of the water used.

Having thus described my invention, what I claim as new and desire to secure by Letters Patent is:—

1. A boiler disincrustating compound, consisting of calcium oxid and baked clay mixed; refined petroleum; the juice of agave leaves; carminic acid; and hydro-chloric acid; mixed in suitable proportions to form a paste.

2. A boiler disincrustating compound, consisting of 100 parts calcium oxid; 20 parts of pulverized baked clay; 15 parts of refined petroleum; 35 parts of the juice of agave leaves; 1 part of carminic acid; 2 parts hydro-chloric acid; all mixed to form a compound.

In testimony whereof I have signed this specification in the presence of two subscribing witnesses.

ROSENDO LADRON DE GUEVARA.

Witnesses:
  W. E. GODMAN,
  M. GARCIA ARSCHAGA.